United States Patent
Choi et al.

(10) Patent No.: US 7,329,320 B2
(45) Date of Patent: Feb. 12, 2008

(54) APPARATUS FOR ELECTRIFYING PARTICLE APPARATUS FOR SCATTERING PARTICLE

(75) Inventors: Hyun-Soo Choi, Suwon-si (KR); Min-Soo Kim, Yongin-si (KR); Hyun-II Park, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 54 days.

(21) Appl. No.: 10/498,555

(22) PCT Filed: Jan. 10, 2002

(86) PCT No.: PCT/KR02/00037

§ 371 (c)(1),
(2), (4) Date: Jun. 14, 2004

(87) PCT Pub. No.: WO03/058331

PCT Pub. Date: Jul. 17, 2003

(65) Prior Publication Data

US 2005/0066891 A1    Mar. 31, 2005

(51) Int. Cl.
*B05C 5/02* (2006.01)

(52) U.S. Cl. .......... 118/629; 118/621; 118/623; 239/690; 239/704; 239/708

(58) Field of Classification Search ........ 118/621, 118/623, 625, 629; 427/475, 485, 469; 239/690–708
See application file for complete search history.

(56) References Cited

U.S. PATENT DOCUMENTS

| | | | | |
|---|---|---|---|---|
| 3,323,933 A | * | 6/1967 | Barford et al. | 427/485 |
| 3,888,207 A | * | 6/1975 | Stutz et al. | 118/621 |
| 3,958,959 A | * | 5/1976 | Cohen et al. | 95/64 |
| 4,597,534 A | * | 7/1986 | Ruud | 239/704 |
| 4,666,283 A | * | 5/1987 | Iida et al. | 399/63 |
| 4,971,829 A | | 11/1990 | Komura et al. | 427/27 |
| 5,749,973 A | | 5/1998 | Komura et al. | 118/626 |
| 6,190,456 B1 | * | 2/2001 | Matsuda | 118/629 |
| 6,649,221 B1 | * | 11/2003 | Tateno et al. | 427/469 |

FOREIGN PATENT DOCUMENTS

| | | | |
|---|---|---|---|
| JP | 5-192612 | * | 8/1993 |
| JP | 08-117639 | | 5/1996 |

* cited by examiner

*Primary Examiner*—Laura Edwards
(74) *Attorney, Agent, or Firm*—F. Chau & Assoc. LLC

(57) ABSTRACT

Disclosed is an apparatus for electrifying spacers and an apparatus for scattering spacers using the same. For the purpose of maintaining a cell gap of a LCD, the spacer is electrified to have a first electrified voltage by a first electrifying pipe having a first curvature, and the spacer is electrified by a second electrifying pipe having a second curvature to have a second electrified voltage level high enough to prevent the spacers from being lumped. Thus, the spacer is not lumped by increasing an electrified voltage thereof, thereby preventing a quality of an image from being deteriorated, the spacer from being lost.

4 Claims, 6 Drawing Sheets

APPARATUS FOR ELECTRIFYING PARTICLE APPARATUS FOR SCATTERING PARTICLE

TECHNICAL FIELD

The present invention relates to an apparatus for electrifying and scattering spacers, and more particularly to an apparatus for electrifying spacers and an apparatus for scattering the spacers using the same, which prevents the spacers from being lumped and uniformly scatters the spacers.

BACKGROUND ART

In general, an LCD (Liquid Crystal Display) for displaying an image by controlling a liquid crystal employs a spacer so as to uniformly maintain a gap between cells of the liquid crystal. When the spacer is not uniformly scattered in the liquid crystal or the cell gap is not uniform, the display quality is deteriorated.

Specifically, after manufacturing a TFT (Thin Film Transistor) substrate and a color filter substrate, a seal line is formed on the TFT substrate as a liquid crystal wall to seal the liquid crystal. The spacer is randomly scattered onto the TFT substrate having the seal line using a wet scattering method or a dry scattering method.

The wet scattering method includes processes such as mixing the spacer with an isopropyl alcohol, spraying the mixture on the TFT substrate and evaporating the isopropyl alcohol. When evaporating the isopropyl alcohol, the spacer is located on the TFT substrate.

The dry scattering method includes processes such as electrifying the spacer by means of rubbing and spraying the electrified spacer on the TFT substrate, thereby locating the spacer on the TFT substrate.

The wet scattering method and the dry scattering method each have demits and merits, the spacers should not be lumped between each other in both methods. When the spacers are not uniformly scattered, the gap between the cells cannot be maintained constantly.

When the cell gap is not uniformly maintained or the spacers are not scattered uniformly, the scattering processes have to be performed repeatedly until the spacers are uniformly scattered, thereby increasing a manufacturing hours, a losing expensive spacers and consuming excessive spacers due to the lumped spacers.

DISCLOSURE OF THE INVENTION

The present invention provides an apparatus for electrifying a particle, which prevents the particle from being lumped.

The present invention provides an apparatus for scattering a particle, which uniformly scatters the particle.

In one aspect of the invention, there is provided an apparatus for electrifying spacer being moved with a fluid in a predetermined electrified voltage, the apparatus comprising: a first pipe for electrifying a spacer to have a first electrified voltage and outputting the spacer; and a second pipe for electrifying the spacer to have a second electrified voltage from the first pipe, the second pipe being connected with the first pipe and having a coil shape.

In another aspect, there is provided an apparatus for scattering a spacer, comprising: a spacer feeder for supplying a spacer with a fluid; a first pipe for electrifying the spacer to have a first electrified voltage and outputting the spacer; a second pipe for electrifying the spacer to have a second electrified voltage from the first pipe, the second pipe being connected with the first pipe and having a coil shape; and a supporter for supporting a substrate on which the spacer from the second pipe is scattered.

According to the cleaning apparatus, a spacer is not lumped by increasing an electrified voltage thereof, thereby preventing a quality of an image from being deteriorated, the spacer from being lost and a cost of an LCD from being increased.

BRIEF DESCRIPTION OF THE DRAWINGS

The above and other advantages of the present invention will become readily apparent by reference to the following detailed description when considered in conjunction with the accompanying drawings wherein.

BEST MODE FOR CARRYING OUT THE INVENTION

Figure 1:
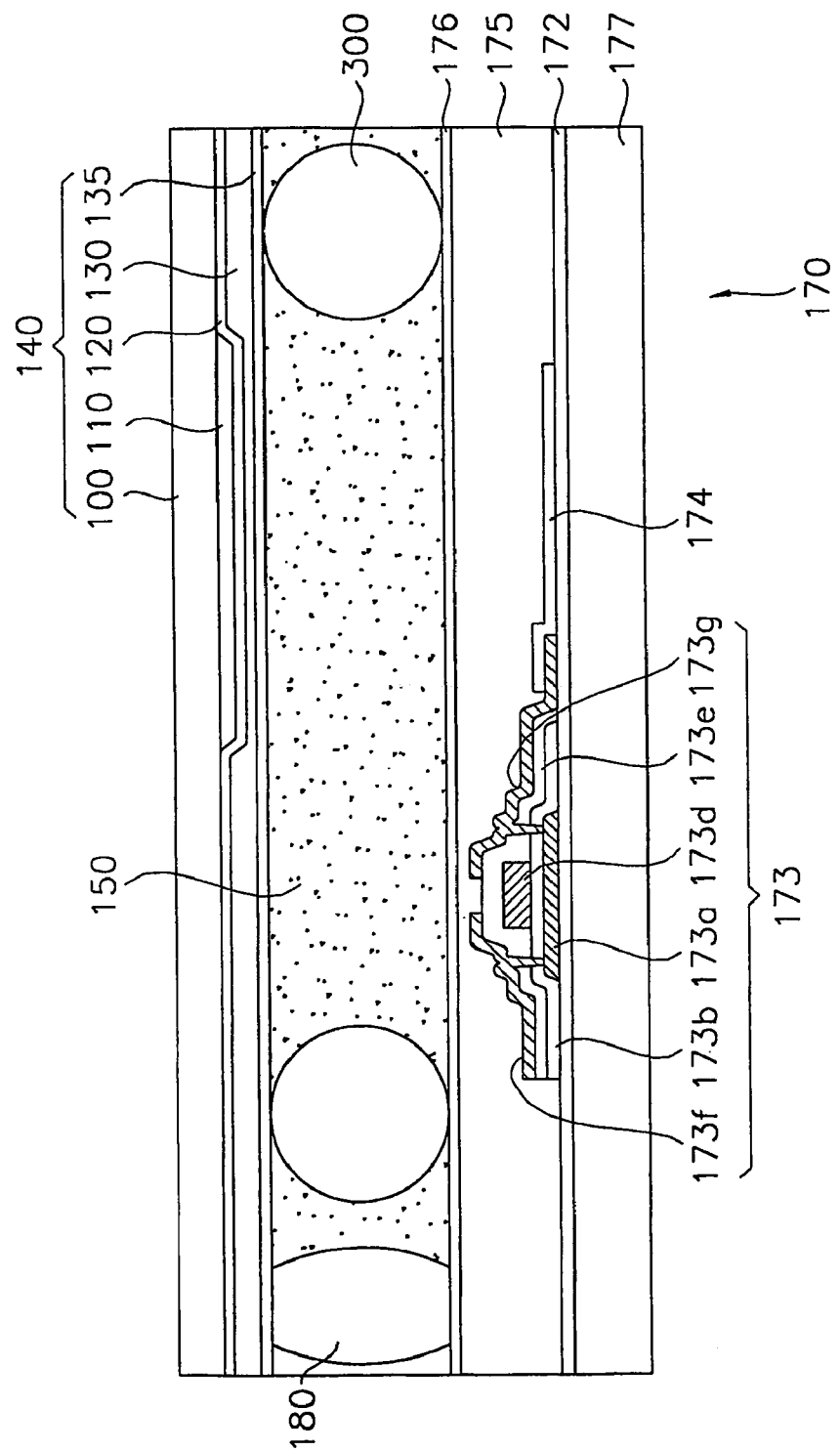
FIG. 1 is a cross-sectional view showing an LCD panel having a particle scattered by an apparatus for scattering the particle according to one exemplary embodiment of the present invention.

FIG. 1 is a cross-sectional view showing an LCD panel having a particle scattered by an apparatus for scattering the particle according to one exemplary embodiment of the present invention.

Hereinafter, "spacer" is defined as a kind of particle that has an electrical polarity because of losing or obtaining electrons by means of rubbings or collisions. The spacer has a sphere shape with a diameter of a few micrometers. The spacer is very expensive because it is difficult to produce spacers having a diameter of a few micrometers and simultaneously having little diameter difference between the spacers.

A spacer used in the LCD panel of the LCD is shown in FIG. 1.

Referring to FIG. 1, an LCD panel 190 includes a TFT substrate 170, a liquid crystal 150, a color filter substrate 140, a driving module (not shown), a space 300 and a sealant 180. The TFT 173 includes a channel layer 173a, a gate electrode 173d, a source electrode 173f, a drain electrode 173g and an insulating layer 173b and 173e for insulating between the gate electrode 173d and the source 173f (or drain electrodes 173g).

Specifically, the TFT substrate 170 includes a first transparent substrate 177, a TFT 173 arranged in a matrix shape on the first transparent substrate 177, and a blocking layer 172 being disposed between the first transparent substrate 177 and the TFT 173, for preventing a harmful ion such as sodium ion from moving from the first transparent substrate 177 to the TFT 173.

A pixel electrode 174 is formed on the blocking layer 172 and electrically connected with the drain electrode 173g. The source electrode 173f receives a power voltage through a data line (not shown), and the power voltage applied to the source electrode 173f is supplied to the drain electrode 173g through the channel layer 173a. The power voltage applied to the drain electrode 173g is supplied to the transparent conductive pixel electrode 174. A level of the power voltage applied to the pixel electrode 174 depends on a level of the power voltage applied to the source electrode 173f.

The channel layer 173a has properties as a conductive substance and a nonconductive substance. In order to operate the channel layer 173a as the conductive substance, the gate electrode 173d disposed on the channel layer 173a should be insulated against the channel layer 173a and the gate electrode 173d should receives the power voltage.

A first alignment layer 175 is formed over the first transparent substrate 177. The first alignment layer 175 has a first alignment groove 176 formed by a rubbing roller (not shown).

The second alignment layer 130 has a second alignment groove 135 formed by the rubbing roller.

The color filter substrate 140 is combined with the TFT substrate 177 to be disposed on the upper surface of the TFT substrate 177.

Specifically, the color filter substrate 140 includes a second transparent substrate 100, a RGB color pixel 110 formed on the second transparent substrate 100, a common electrode 120 disposed on the RGB pixel 110 and the second transparent substrate 100, and a second alignment layer 130 disposed on the common electrode 120. The RGB pixel 110 faces to the pixel electrode 174 of the TFT substrate 170.

After disposing the color filter substrate 140 on the TFT substrate 170, a seal line 180 is formed on the TFT substrate 170 to include an effective display area (not shown). The spacer 300 is scattered to have a predetermined distribution between the TFT substrate 170 and the color filter substrate 140. The spacer 300 maintains a cell gap that is a distance between the color filter substrate 140 and the TFT substrate 170 to uniformly make a thickness of the liquid crystal 150 interposed between the color filter substrate 140 and the TFT substrate 170.

It is very important that the spacers are not lumped with another in order to maintain the cell gap uniformly.

Figure 2:
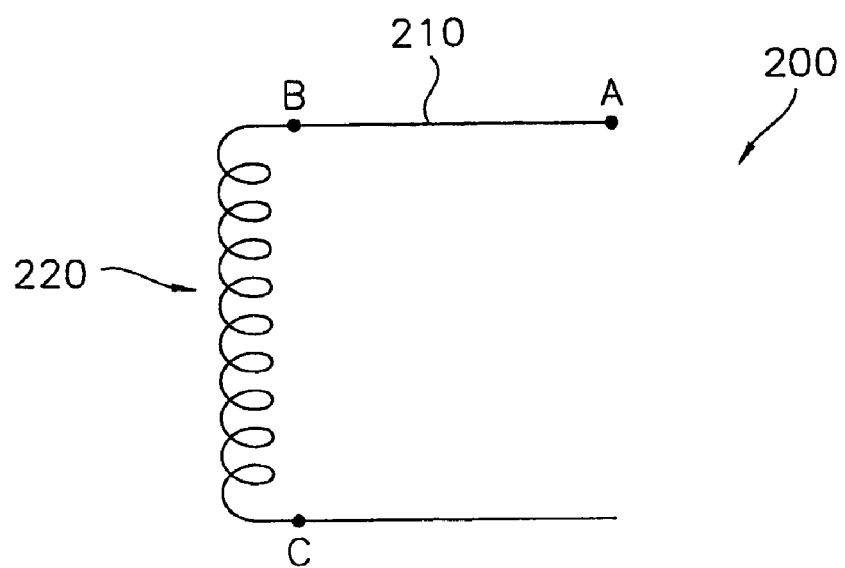
FIG. 2 is a schematic view showing an apparatus for electrifying a particle according to one exemplary embodiment of the present invention.

To prevent the spacer 300 from being lumped with other spacer, a spacer electrifying apparatus 200 as shown in FIG. 2 is employed in the present invention.

Figure 3:
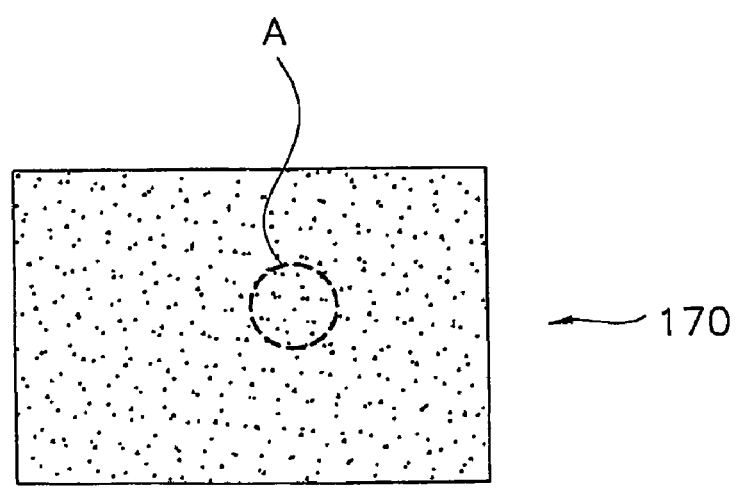
FIG. 3 is a view showing a lumping phenomenon of a particle occurred on a TFT substrate.
Figure 4:
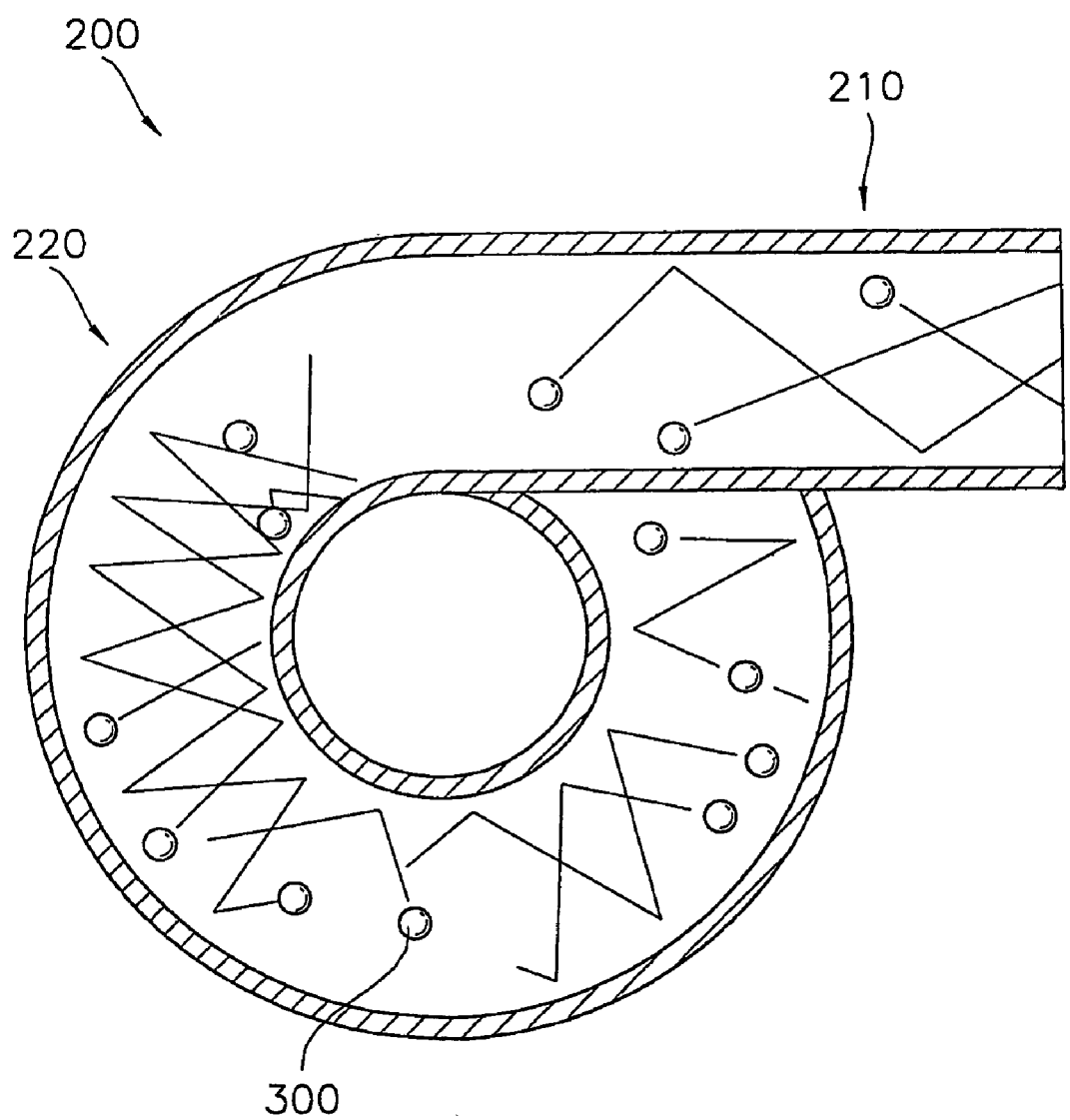
FIG. 4 is a cross-sectional view showing an internal structure of an apparatus for electrifying a particle according to one exemplary embodiment of the present invention.

FIG. 2 is a schematic view showing an apparatus for electrifying a particle according to one exemplary embodiment of the present invention. FIG. 3 is a view showing a lumping phenomenon of a particle occurred on a TFT substrate. FIG. 4 is a cross-sectional view showing an internal structure of an apparatus for electrifying a particle according to one exemplary embodiment of the present invention.

Referring to FIG. 2, the spacer electrifying apparatus 200 includes a first electrifying pipe 210 and a second electrifying pipe 220.

Both ends of the first electrifying pipe 210 corresponding to A-B shown in FIG. 2 are opened. The first electrifying pipe 210 has a first curvature and includes an inlet receiving the spacer and an outlet outputting the spacer. Hereinafter, the inlet and the outlet of the first electrifying pipe 210 are defined as a first spacer inlet and a first spacer outlet, respectively. The spacer is inputted through the first spacer inlet and outputted through the first spacer outlet with a fluid flowing through the first electrifying pipe 210 in a high speed.

Figure 5:
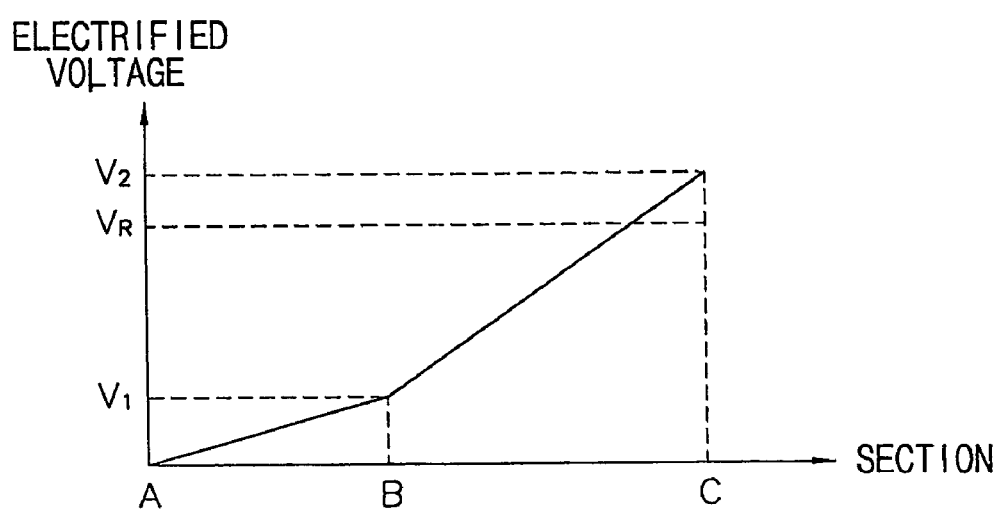
FIG. 5 is a graph showing variations of an electrified voltage according to the apparatus for electrifying the particle shown in FIG. 4.

The spacer outputted from the first spacer outlet is electrified to have a first electrified voltage $V_1$ as shown in FIG. 5 by losing or obtaining electrons while passing through the first electrifying pipe 210.

The first electrified voltage $V_1$ is less than 0.5 volts. However, if the spacer having the first electrified voltage $V_1$ of about 0.5 volts is scattered on the TFT substrate 170, the spacer may be lumped with other spacer because the first electrified voltage $V_1$ is much lower than a reference voltage $V_R$ which is enough voltage to prevent the spacer from being lumped.

The spacers can be lumped frequently when the spacers is scattered onto the TFT substrate 170 after the spacers has the first electrified voltage. The size of the electrified voltage is important.

The spacers having a first electrified voltage less than 0.5 volt do not cause the "spacer lumping phenomenon" in a LCD having a small LCD panel.

However, in a LCD having a large or medium LCD panel, the "spacer lumping phenomenon" occurs, thereby to cause poor display quality due to the non-uniform cell gap.

To prevent the spacers from being lumped, the electrified voltage of the spacers has to be increased in proportion to a size of the effective display area of an LCD.

When the spacer having the electrified voltage less than 0.5 volts is scattered onto a large-sized LCD, the spacer is lumped with other spacer as shown in FIG. 3. The lumped spacers are shown at 'A' of FIG. 3.

When the spacers are lumped on the TFT substrate 170, the spacer cannot be removed by a manual manner of a user. Thus, the TFT substrate 170 has to be reprocessed.

Referring to FIG. 2, the spacer having the electrified voltage of about 0.5 volts can obtain an second electrified voltage by the second electrifying pipe 220, the second electrified voltage being higher than a reference electrified voltage $V_R$.

The second electrifying pipe 220 has a coil shape as shown in FIGS. 1 and 4. The second electrifying pipe 220 wound in the coil shape activates a movement of the spacer 300 as shown in FIG. 4. The movement of the spacer 300 is greatly activated while passing through the second electrifying pipe 220 having a second curvature larger than that of the first electrifying pipe 210.

Accordingly, the electrified voltage of the spacer 300 increases when the spacer 300 passes through the second electrifying pipe 220.

FIG. 5 is a graph showing variations of an electrified voltage according to the apparatus for electrifying the particle shown in FIG. 4.

As shown in FIG. 5, the spacer 300 passed through the second electrifying pipe 220 has a second electrified voltage $V_2$ higher than that of the reference electrified voltage $V_R$.

To electrify the spacer 300 to have the second electrified voltage $V_2$ higher than that of the reference electrified voltage $V_R$, it is required to consider a diameter, a winding numbers and a winding diameter of the second electrifying pipe 220 in addition to the curvature thereof.

Figure 6:
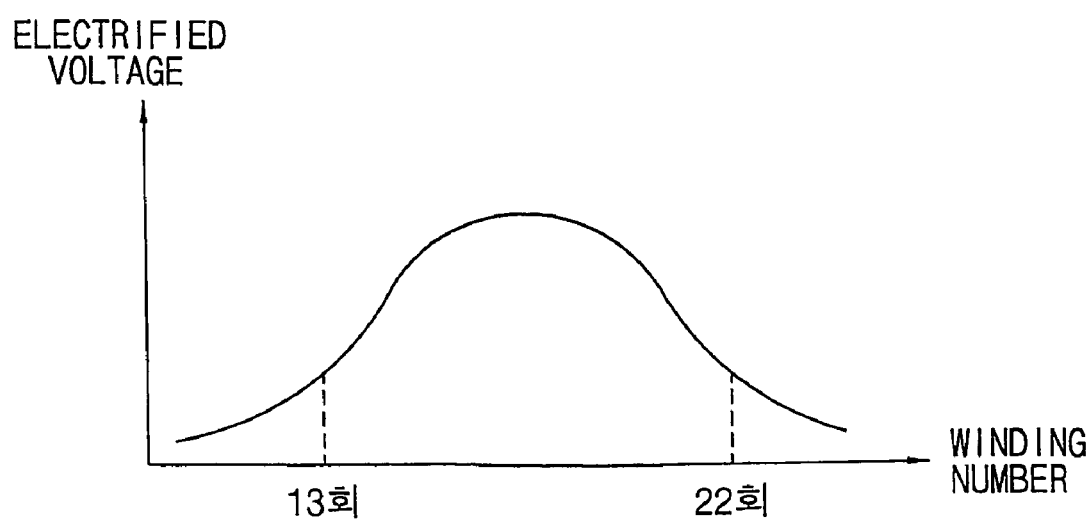
FIG. 6 is a graph showing variations of an electrified voltage according to winding numbers of the apparatus for electrifying the particle shown in FIG. 4.
Figure 7:
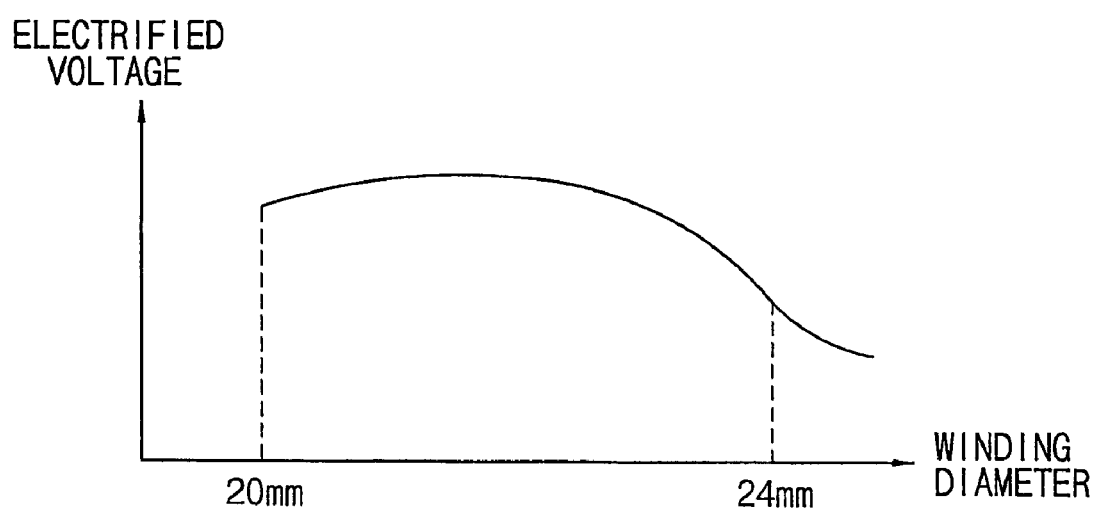
FIG. 7 is a graph showing variations of an electrified voltage according to a winding diameter of the apparatus for electrifying the particle shown in FIG. 4.

FIGS. 6 and 7 are graphs showing variations of an electrified voltage according to winding numbers and winding diameter of a second electrifying pipe shown in FIG. 2. In FIG. 6, the electrified voltage is measured using a first and second electrifying pipes 210 and 220 that employ a stainless steel tube having an inner diameter of about 6 mm.

Referring to FIG. 6, when increasing the winding numbers of the second electrifying pipe 220 without changing the diameter of the second electrifying pipe 220, the distribution of the electrified voltage of the spacer 300 shows a curve such as a quadratic curve. When the winding number of the second electrifying pipe 220 is more than at least two, the second electrified voltage $V_2$ of the spacer 300 gradually increases and shows a maximum electrified voltage when the winding number of the second electrifying pipe 220 is about 20. When the winding number of the second electrifying pipe 220 is more than 20, the second electrified voltage $V_2$ of the spacer 300 decreases as shown in FIG. 6.

Accordingly, in the present invention, the second electrifying pipe 220 having the inner diameter of about 6 mm is wound within the range of about 13 to 22 turns. Preferably, the second electrifying pipe 220 wound over 20 turns is used in order to obtain the maximum electrified voltage.

The winding numbers can be changed depending on the inner diameter of the second electrifying pipe 220. When changing the inner diameter of the second electrifying pipe 220 according as a new equipment, the winding numbers of the second electrifying pipe 220 also should be newly set so as to supply the maximum electrified voltage to the spacer 300 passing through the second electrifying pipe 220.

Referring to FIG. 7, when increasing the winding diameter of the second electrifying pipe 220, the second electrified voltage of the spacer 300 gradually decreases. If the second electrifying pipe 220 has the diameter of about 6 mm and the winding diameter within the range of about 20 to 24 mm, the spacer 300 can have an enough electrified voltage to prevent the spacer 300 from being lumped.

When the diameter of the second electrifying pipe 220 is about 6 mm, it is very difficult to fabricate the second electrifying pipe 220 of which the winding diameter is smaller than 20 mm. In addition, when the diameter of the second electrifying pipe 220 is about 6 mm and the winding diameter of the second electrifying pipe 220 is larger than 24 mm, the electrified voltage of the spacer is smaller than the reference voltage $V_R$.

If the second electrifying pipe 220 has the inner diameter of about 6 mm, the second electrifying pipe 220 has to be wound to have the winding diameter of about 20 to 24 mm to obtain the maximum electrified voltage of about 5 volts. Further, if the inner diameter of the second electrifying pipe 220 is changed to have a smaller or a larger inner diameter than 6 mm, the winding numbers thereof has to be newly set corresponding to the inner diameter thereof.

If the second electrifying pipe 220 has the inner diameter of about 6 mm, the second electrifying pipe 220 has the winding diameter of about 20 mm and the winding number of 20 turns so as to obtain the second electrified voltage larger than 5 volts.

The electrified voltage of the conventional spacer 300 is smaller than 0.5 V, but the electrified voltage of the spacer 300 of the present invention is 10 times as large as the electrified voltage of the conventional spacer 300.

In result, the spacer 300 can be electrified to have the second electrified voltage $V_2$ which is enough voltage to prevent the spacer 300 from being lumped when the spacer sequentially passes through the first and second electrifying pipes 210 and 220.

Hereinafter, an apparatus 200 for scattering the spacer will be described with reference to FIG. 8.

Figure 8:
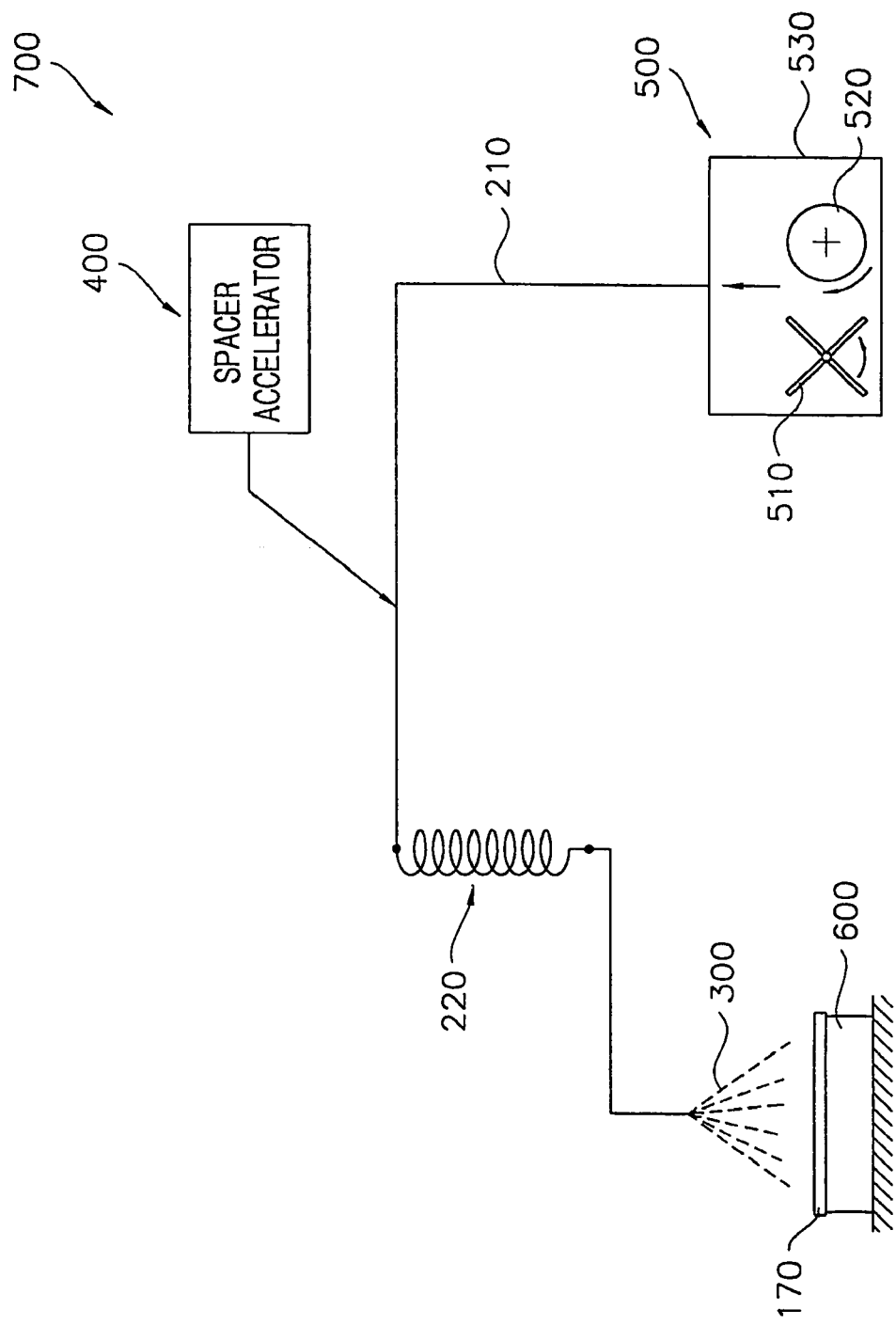
FIG. 8 is a schematic view showing an apparatus for scattering a particle according to one exemplary embodiment of the present invention.

FIG. 8 is a schematic view showing an apparatus for scattering a particle according to one exemplary embodiment of the present invention.

Referring to FIG. 8, the spacer scattering apparatus 700 includes a spacer feeder 500, a first electrifying pipe 210, a second electrifying pipe 220 and supporting body 600.

The spacer feeder 500 includes a container 530, a stirring roller 510 and a feeder roller 520. Specifically, the container 530 receives a lot of spacer 300. The spacers 300 received in the container 530 are stirred by means of the stirring roller 510. The spacers 300 stirred by the stirring roller 510 are picked up by the feeder roller 520. Then, the spacers 300 are carried on a nonvolatile gas and are exhausted to the exterior.

The spacers 300 picked up by the feed roller 520 sequentially pass through the first and the second electrifying pipes 210 and 220.

The spacer 300 is electrified to have the first electrified voltage $V_1$ while passing through the first electrifying pipe 210, and the spacer 300 is electrified to have the second electrified voltage $V_2$ while passing through the second electrifying pipe 220. The second electrifying pipe 220 has a coil shape as a exemplary embodiment.

To increase the second electrified voltage of the spacer 300, the second electrifying pipe 220 has the coil shape and the inner diameter of about 6 mm, the winding diameter within the range of 20 to 24 mm and the winding numbers of about 13 to 24 times.

The spacer scattering apparatus 700 further includes a spacer accelerator 400 disposed between the first and second electrifying pipes 210 and 220. The spacer accelerator 400 accelerates the spacers supplied to the second electrifying pipe 220. For this purpose, the spacer accelerator 400 supplies the nonvolatile gas such as a nitrogen gas, so that the spacer 300 can flows in a fast speed through the second electrifying pipe 220.

The spacer 300 passed through the second electrifying pipe 220 is electrified to have the second electrified voltage $V_2$ higher than the reference electrified voltage $V_R$ as shown in FIG. 5.

The spacer 300 having the second electrified voltage 220 is scattered uniformly onto the TFT substrate 170 of the LCD panel 190.

According to the spacer scattering apparatus, the spacers are not lumped between each other by increasing an electrified voltage thereof, thereby preventing a quality of an image from being deteriorated due to non-uniform cell gap, preventing working hours for producing the spacers from being increased due to repeats of processing the spacers. Also, the required number of the spacers can be reduced because of the uniformly scattered spacers.

This invention has been described above with reference to the exemplary embodiments. It is evident, however, that many modifications and variations will be apparent to those having ordinary skill in the art in light of the foregoing description. Accordingly, the present invention embraces all such alternative modifications and variations as fall within the spirit and scope of the appended claims.

The invention claimed is:

1. An apparatus for scattering a spacer employed by a liquid crystal apparatus, comprising:

a spacer feeder for supplying a spacer to be carried on a fluid;

a first pipe for electrifying the spacer to have a first electrified voltage and outputting the spacer;

a second pipe for electrifying the spacer outputted from the first pipe to have a second electrified voltage, the second pipe being connected with the first pipe and having a coil shape;

a spacer accelerator disposed between the first and second pipes, wherein the spacer accelerator accelerates a velocity of the spacer outputted to the second pipe; and a supporter for supporting a substrate onto which the spacer outputted from the second pipe is scattered, wherein the spacer feeder comprises:

a container for receiving the spacer;

a first roller for stirring the spacer in the container, the first roller having a first shape and being disposed in the container; and a second roller for picking up the spacer and feeding the spacer to the first pipe, the second roller having a second shape different from the first shape and being disposed in the container.

2. The apparatus of claim 1, wherein the second pipe has an inner diameter of about 6 mm, and wherein the second pipe is wound by about 13 to about 24 times and the second pipe is wound to have a winding diameter of about 20 to about 24 mm.

3. The apparatus of claim 1, wherein the spacer outputted from the second pipe has an electrified voltage of about 0.5 to about 5 volts.

4. The apparatus of claim 1, wherein the spacer accelerator includes a gas supplying pipe being connected with the first pipe, for supplying a nonvolatile gas to the first pipe.

* * * * *